(Model.)
J. G. TILLER.
Oil Guard for Car Axle Boxes.
No. 235,917.        Patented Dec. 28, 1880.
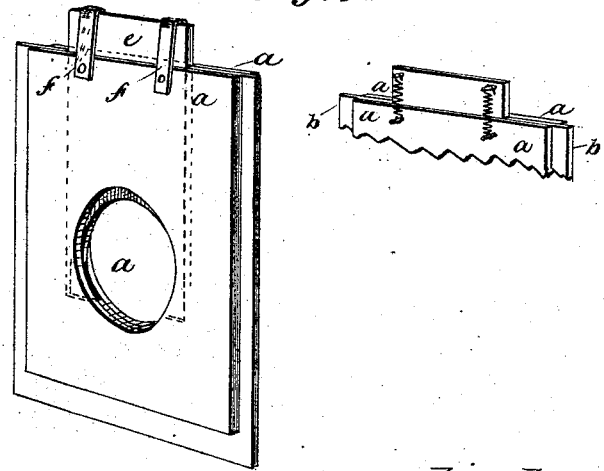
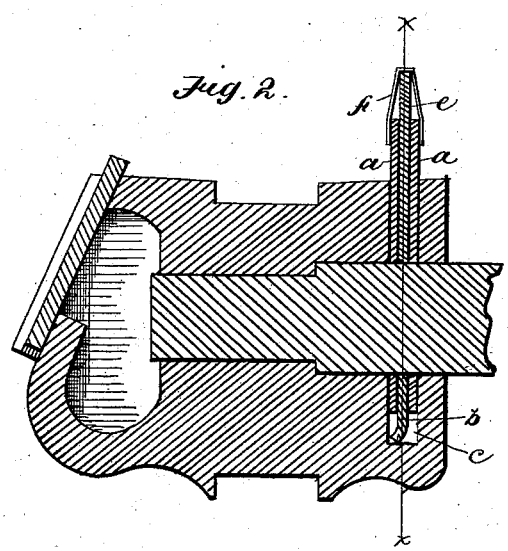
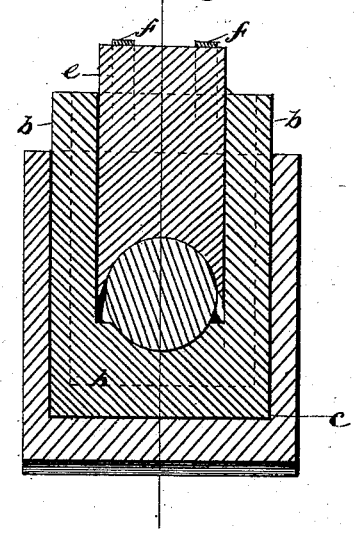
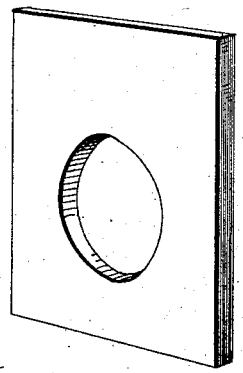
Attest
Wm H. H. Knight
W. Blackstock
Inventor,
John G. Tiller.
By Hill & Church,
His attys.

UNITED STATES PATENT OFFICE.

JOHN G. TILLER, OF ASHLAND, VIRGINIA.

OIL-GUARD FOR CAR-AXLE BOXES.

SPECIFICATION forming part of Letters Patent No. 235,917, dated December 28, 1880.

Application filed November 5, 1880. (Model.)

*To all whom it may concern:*

Be it known that I, JOHN G. TILLER, of Ashland, in the county of Hanover and State of Virginia, have invented a certain new and Improved Oil-Guard for Car-Axle Boxes; and I do hereby declare the following to be a full, clear, and exact description of the same, reference being had to the accompanying drawings, forming part of this specification, in which—

Figure 1 is a perspective view of my improved oil-guard; Fig. 2, a longitudinal sectional view, showing the application of the guard to a car-axle box; Fig. 3, a transverse sectional view taken on the line $x\ x$, Fig. 2; and Fig. 4, a view of the old form of guard.

Similar letters of reference in the several figures denote the same parts.

My invention has for its object to provide an improved oil-guard for preventing the escape of oil from the inner side of a car-axle box along the axle, which shall be cheap and simple in construction and capable of being applied to axle-boxes already in use without change or alteration therein; and to this end it consists in a peculiarly-constructed washer or guard adapted to be inserted within a recess or chamber in the box and to fit closely around the axle, substantially as I will now proceed to describe.

The ordinary car-axle box, such as shown in Fig. 2, is provided with a recess or chamber, $c$, at its rear side, in which fits ordinarily a plain rectangular washer or oil-guard, like that represented in Fig. 4, having a perforation through it for the passage of the axle, as shown. When the bearing of the box is new this plain guard answers moderately well to prevent the escape of the oil along the axle; but as the bearing wears the opening in the guard becomes larger, and, no longer preserving a close joint with the axle, permits the oil to escape.

Various attempts have been made to improve upon the plain guard, and produce a guard that shall adapt itself to the axle, so as to form a tight joint under all circumstances; but, although the result has been accomplished to a certain extent in various ways, the means employed have been so complicated and expensive as to prevent their adoption by the railroad companies.

The guard which I have invented, and which is believed to answer all the requirements necessary to its adoption, consists of two thin rectangular plates, $a\ a$, of wood, iron, or other material, between which is confined a piece of sheet-rubber, $b$, in such manner as that the rubber shall project a slight distance beyond the side edges of the plates and a greater distance beyond the lower edge of said plates, as shown in Fig. 1. An opening, $a'$, is made through both plates for the passage of the axle. The rubber does not cover the entire internal area of the plates, but only extends inward from the edges to the distance marked by the dotted lines in Fig. 1, thus leaving a space between the plates of a form inclosed by the said dotted lines and extending clear to the upper edge of the plates. Within this space so formed is placed a movable plate, $e$, the lower end of which is concaved to fit the axle, while its upper end is preferably straight, and projects considerably above the top of plates $a\ a$, as shown. Elastic straps $f\ f$, or their equivalents, applied to the upper end of the movable plate, operate to press the concave portion of the plate against the axle, and, with the opposite side of the opening through the two fixed plates, preserve at all times a close joint with the axle, which will effectually arrest the progress of the oil along the latter. The projecting rubber along the sides and bottom of the guard fits snugly against the walls of the chamber or recess, and forms tight joints all around, which prevent the possible escape of oil at that point. The rubber is extended a greater distance beyond the lower edges of the plates of the guard, so that it can be compressed or bent down, as shown in Fig. 2, when placed in a box having a new bearing, and gradually straighten or spring back into vertical position as the bearing wears, and thus preserve the joint unimpaired.

A guard constructed as I have described can be made easily and cheaply, and can be applied to the axle-boxes in present use without changing their construction.

I claim as my invention—

The oil-guard herein described, consisting of the perforated outside plates, the intermediate rubber plate projecting beyond the side and bottom edges of the outside plates, as described, and the movable plate working between the outside plates and having the concave lower end, and the elastic bands, or their equivalents, for keeping the movable plate against the axle, substantially as described.

JOHN G. TILLER.

Witnesses:
 JOSEPH FORREST,
 M. CHURCH.